United States Patent
Yamakawa et al.

(10) Patent No.: US 6,190,132 B1
(45) Date of Patent: Feb. 20, 2001

(54) ROTOR BLADE FOR ROTORCRAFT

(75) Inventors: Eiichi Yamakawa; Atsushi Murashige; Tomoka Tsujiuchi, all of Kakamigahara (JP)

(73) Assignee: Advanced Technology Institute of Commuter-Helicopter, Ltd., Gifu (JP)

( * ) Notice: Under 35 U.S.C. 154(b), the term of this patent shall be extended for 0 days.

(21) Appl. No.: 09/404,824

(22) Filed: Sep. 24, 1999

(30) Foreign Application Priority Data

Mar. 12, 1999 (JP) .................................................. 11-067528

(51) Int. Cl.[7] .................................................. B64C 27/46
(52) U.S. Cl. ...................................... 416/228; 416/DIG. 2
(58) Field of Search ............................... 416/223 R, 228, 416/235, 237, 238, DIG. 2, DIG. 5

(56) References Cited

U.S. PATENT DOCUMENTS

| | | | |
|---|---|---|---|
| 4,248,572 | * | 2/1981 | Fradenburgh .......................... 416/228 |
| 4,451,206 | * | 5/1984 | Philippe et al. ....................... 416/228 |
| 4,569,633 | * | 2/1986 | Flemming, Jr. ........................ 416/228 |
| 4,880,355 | * | 11/1989 | Vuillet et al. ........................... 416/228 |
| 5,957,662 | * | 10/1999 | Aoki et al. ........................ 416/223 R |
| 5,961,290 | * | 10/1999 | Aoki et al. ........................ 416/223 R |
| 6,000,911 | * | 10/1999 | Toulmay et al. .................. 416/223 R |

* cited by examiner

Primary Examiner—Edward K. Look
Assistant Examiner—James M McAleenan
(74) Attorney, Agent, or Firm—Wenderoth, Lind & Ponack, L.L.P.

(57) ABSTRACT

A blade root portion of a rotor blade is attached to a rotor head for rotating. A center portion linearly elongates from the blade root portion. A blade tip portion outward elongates from the center portion and has a shape which is defined by a leading edge, a side edge and a trailing edge, and has a predetermined aerofoil. In the leading edge of the blade tip portion, a swept-back angle $\lambda(r)$ at a distance r from the rotation center of a rotor satisfies relational expression (1) of a rotor blade length R of a rotorcraft, a maximum flight Mach number $M_\infty$ which is a flight limit speed of the rotorcraft, a blade tip Mach number $M_{TIP}$ which is a tip speed during hovering, and a drag divergence Mach number $M_{dd}$ which is determined from the aerofoil of the blade tip portion. According to this configuration, it is possible to provide a rotor blade for a rotorcraft in which the performance in high-speed flying is improved, the high-speed impulsive noise can be reduced, and a high control performance is attained.

14 Claims, 12 Drawing Sheets

UNHEDRAL ANGLE

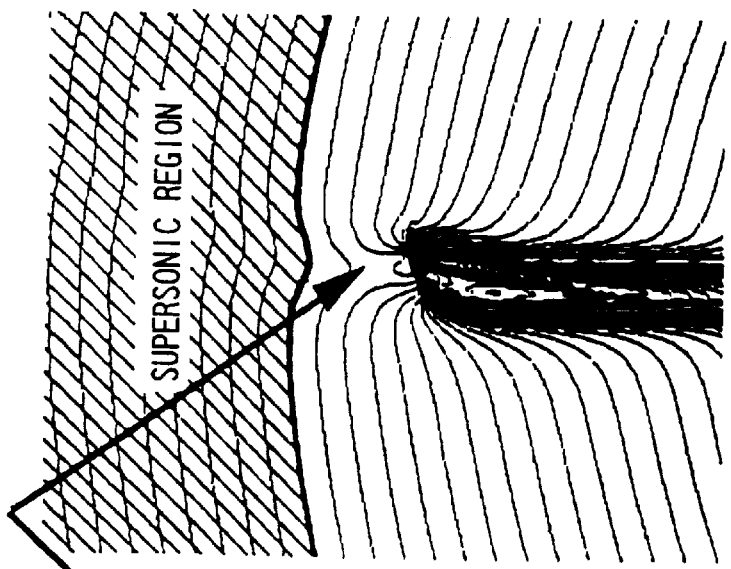
FIG. 6A NONLOCALIZATION OF SUPERSONIC REGION
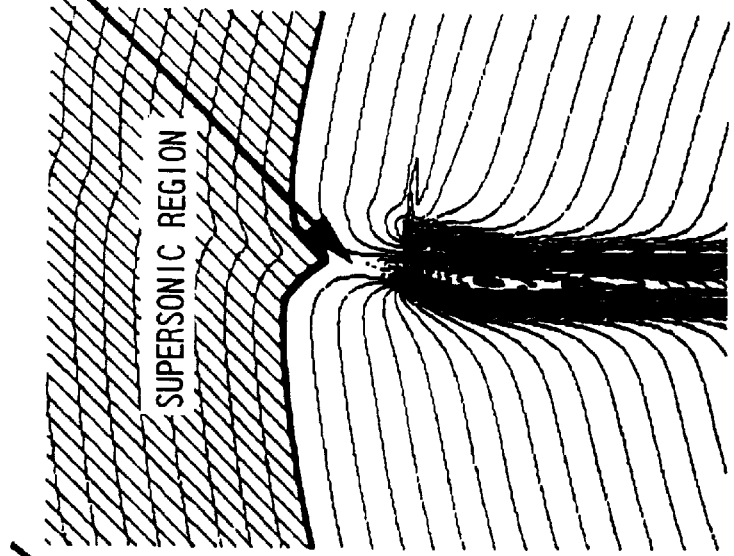
FIG. 6B RELAXATION OF PRESSURE VARIATION NEAR BLADE
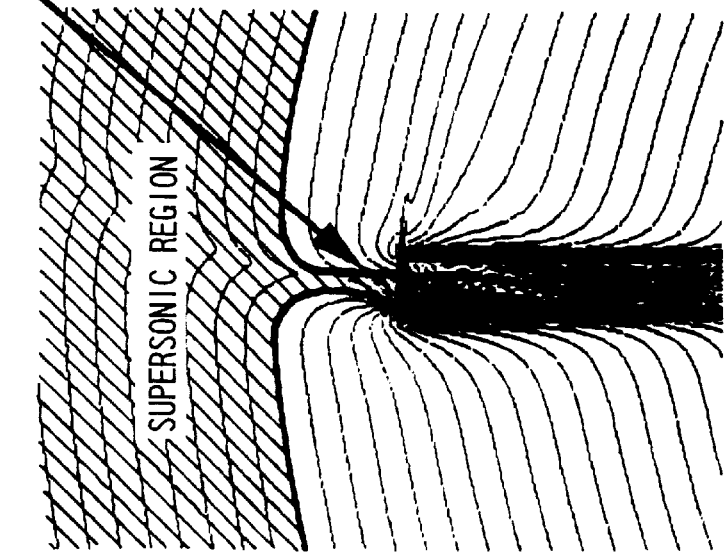
FIG. 6C

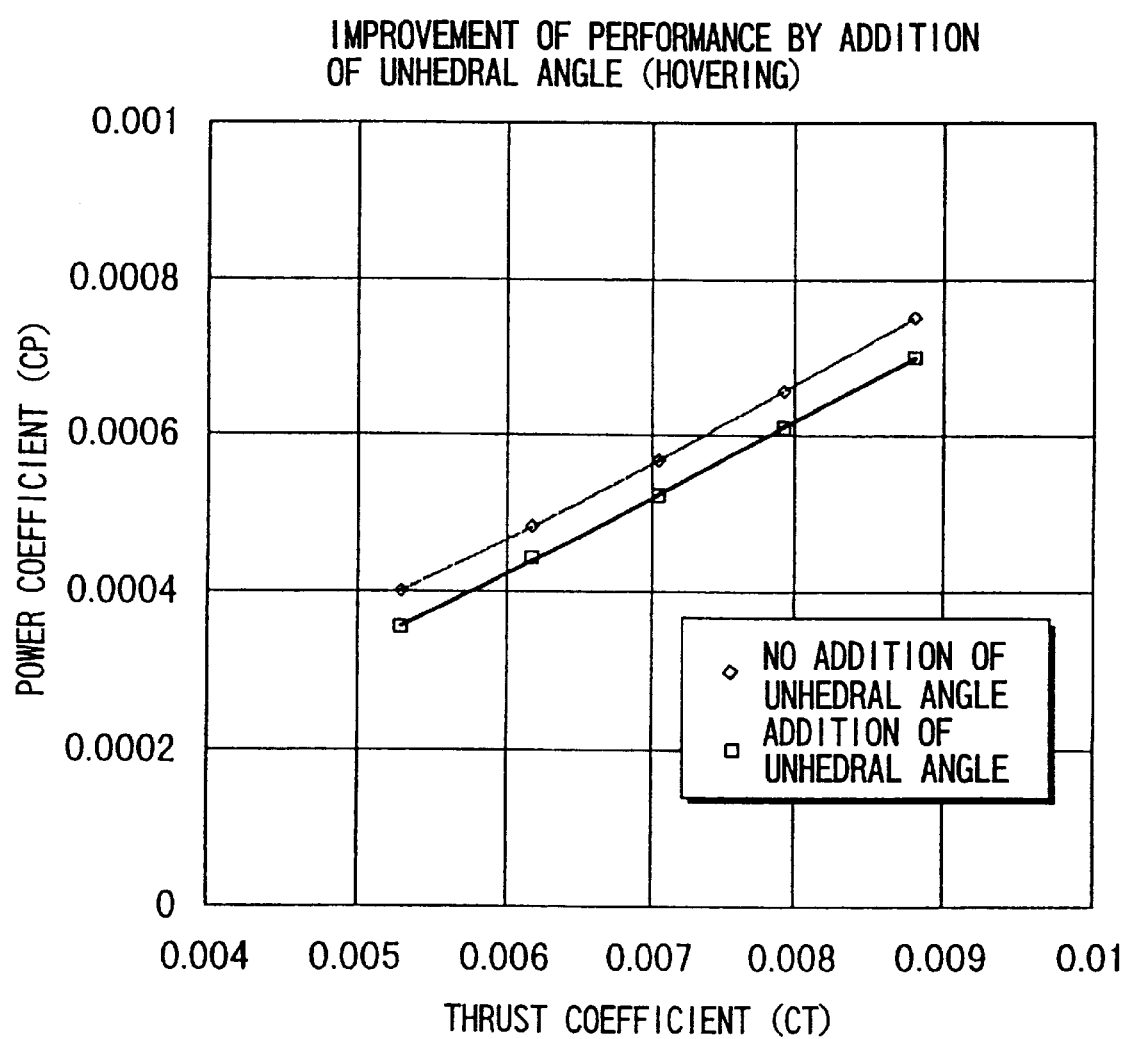

ROTOR BLADE FOR ROTORCRAFT

BACKGROUND OF THE INVENTION

1. Field of the Invention

The present invention relates to a rotor blade for rotorcraft such as a helicopter.

2. Description of the Related Art

FIGS. 13A and 13B are views showing the aerodynamic environment of a helicopter rotor in the forward flight case. As shown in FIG. 13A, when a helicopter 1 having rotor blades of a rotor radius R and rotating at an angular speed $\Omega$ advances at a ground velocity V, an advancing blade in which the ground velocity V is added to a rotor speed $\Omega R$, and a retreating blade in which the ground velocity V is subtracted from the rotor speed $\Omega R$ are largely different in airspeed from each other.

At the azimuth angle $\Psi$ (an angle measured counterclockwise from the rearward direction of the helicopter 1) of 90 degrees, the airspeed of the advancing blade reaches the maximum, and the airspeed of the tip of the advancing blade is $\Omega R+V$. At the position of $\Psi=270$ degrees, on the other hand, the airspeed of the retreating blade reaches the minimum, and the airspeed of the tip of the retreating blade is $\Omega R-V$. The airspeed at an intermediate portion of the blade has a value which is obtained by proportionally distributing $\Omega R+V$ and $\Omega R-V$. Assuming that $\Omega R=795$ km/h and V=278 km/h, for example, the airspeed at the position of about 35% from the root end of the retreating blade is zero as shown in FIG. 13A.

When a helicopter flies at high speed, particularly, the airspeed at the tip of the advancing blade is transonic and a strong shock wave is generated. In a drag divergence region shown as a hatched portion in FIG. 13B, this strong shock wave causes an abrupt increase of drag which acts on the blade. Noise which is generated by such a strong shock wave is called high-speed impulsive noise. At this time, in a coordinate system as seen from a rotating rotor blade, a phenomenon which is called delocalization of supersonic region occurs. The generated shock wave propagates to a distant place through a delocalization supersonic region. As a result, high level of noise is observed in the distant place.

In the retreating blade, since the airspeed thereof is significantly lowered, angle of attack $\alpha$ of the blade must be increased in order to obtain a lift which is equivalent to that of the advancing blade. For this purpose, it is common to carry out pitch control in which a pitch angle of the blade is controlled in accordance with azimuth angle $\Psi$. The pitch angle of the blade is controlled using a sinusoidal wave which has a minimum amplitude at $\Psi=90$ degrees and a maximum at $\Psi=270$ degrees. At this time, as shown in FIG. 13B, the angle of attack a of the blade is changed in a span direction by flapping movement of the blade itself. In the case of $\Psi=90$ degrees, for example, the angle of attack a of the blade is about 0 degree at the root, and about 4 degrees at the tip. In the case of $\Psi=270$ degrees, the angle of attack $\alpha$ of the blade is about 0 degrees at the root, and about 16 to 18 degrees at the tip, and exceeds the stall angle of attack. When the angle of attack $\alpha$ exceeds the stall angle of attack, large changes of lift coefficient Cl and pitching moment coefficient Cm suddenly occur, resulting in that a large vibration of the airframe and fatigue loads in pitch links are generated.

In this way, the high-speed impulsive noise is used as an evaluation item for the advancing blade, and the maximum lift coefficient Clmax and the stall angle of attack are used as evaluation items for the retreating blade. The maximum lift coefficient Clmax is defined by the maximum value of the lift coefficient Cl when the angle of attack $\alpha$ of a blade having a predetermined aerofoil is gradually increased to reach the stall angle of attack. Usually, as the high-speed impulsive noise and absolute value of the pitching moment coefficient Cm are smaller, or as the maximum lift coefficient Clmax and the stall angle of attack are larger, the blade is judged to be more excellent.

In order to improve the performance of the high-speed flight and to reduce the high-speed impulsive noise, a thin airfoil section may be employed in a blade tip portion. In this method, however, the stall angle of attack is small and also the maximum lift coefficient is small. Therefore, this method is not appropriate. For the above-mentioned purpose, another method in which a simple swept-back angle is formed in the blade tip portion as shown in FIG. 14 is usually employed. A shape provided with the simple swept-back angle is obtained by sweeping back the blade tip portion by a constant swept-back angle. When the simple swept-back angle is formed in the blade tip portion, however, aerodynamic center of the blade tip portion is largely shifted in a rearward direction as shown in FIG. 14. At a position where the aerodynamic center is rearward shifted from a pitch axis by a length $\Delta X$, a moment M about the pitch axis has a value which is obtained by multiplying a lift L with the length $\Delta X$. In the case where the simple swept-back angle is formed as described above, the pitching moment in the direction of the head-down is increased, with the result that control performance is lowered.

SUMMARY OF THE INVENTION

It is an object of the invention to provide a rotor blade for a rotorcraft in which, in combination with a high-performance third-generation airfoil for a helicopter of high maximum lift coefficient Clmax and drag divergence Mach number $M_{dd}$ (for example, Japanese Patent Application No. 11-45196(1999)), improvement of performance in high-speed flying, reduction of high-speed impulsive noise, less increase of pitching moment and high control performance are attained.

The invention provides a rotor blade for rotorcraft, comprising:

a blade root portion 10 which is to be attached to a rotor head for rotating;

a center portion 11 which linearly elongates from the blade root portion 10; and a blade tip portion 12 which has a shape and a predetermined aerofoil, the shape elongating outward from the center portion 11 and being defined by a leading edge 23, a side edge 25, and a trailing edge 30, wherein in the leading edge 23 of the blade tip portion 12, a swept-back angle $\lambda(r)$ at a distance r from a rotation center of a rotor satisfies the following relational expression (1):

$$\cos^{-1}\frac{M_{dd}}{M_\infty + M_{TIP}\frac{r}{R}} \leq \lambda(r) \leq \cos^{-1}\frac{0.985 \times M_{dd}}{M_\infty + M_{TIP}\frac{r}{R}} \quad (1)$$

where R is a rotor blade length of the rotorcraft, $M_\infty$ is a maximum flight Mach number which is a flight limit speed of the rotorcraft, $M_{TIP}$ is a blade tip Mach number which is a tip speed during hovering, and $M_{dd}$ is a drag divergence Mach number determined from the aerofoil of the blade tip portion 12.

FIG. 11 is a graph showing the drag divergence Mach number $M_{dd}$. The abscissa of the graph indicates a flight Mach number M of a certain rotorcraft which is normalized by a normalization constant $M_{cr}$, and the ordinate indicates a drag coefficient $C_d$ which is normalized by a normalization constant $C_{dinc}$. The graph shows that, when the flight Mach number M is small, the drag coefficient $C_d$ is substantially constant, and, when the flight Mach number M exceeds a certain value, the drag coefficient $C_d$ is suddenly increased. When the inflow Mach number to the blade leading edge is increased, a supersonic region appears on a blade surface, and a shock wave is formed, with the result that drag is rapidly increased and loud noise due to the shock wave is generated. These phenomena are caused due to compressibility of the air. As an index indicating the influence of compressibility is used the drag divergence Mach number $M_{dd}$. The drag divergence Mach number $M_{dd}$ is a value peculiar to the airfoil, and defined as the flight Mach number M in the case where $dC_d/dM$ is 0.1.

FIG. 12 is a view showing an effective Mach number at the leading edge 23. At a position which is separated by the distance r from the rotation center of the rotor, the swept-back angle of the leading edge 23 is expressed by the swept-back angle $\lambda(r)$, and the Mach number in the coordinate system on the blade is expressed by $(M_\infty + M_{TIP} r/R)$, using the blade length R, the maximum flight Mach number $M_\infty$ and the blade tip Mach number $M_{TIP}$. The effective Mach number which is effective to a drag of the blade is a component of the Mach number in a direction perpendicular to the leading edge 23, and is expressed by $(M_\infty + M_{TIP} r/R) \cos\lambda(r)$.

According to the invention, in the blade tip portion 12 where drag divergence in high-speed flight occurs most easily, the leading edge 23 is shaped in accordance with the relational expression (1). The relational expression (1) defines a variation range of the swept-back angle $\lambda(r)$, and the function $\lambda(r)$ of the distance r expresses the shape of the leading edge 23. In the relational expression (1), it will be seen from an inequality defining the lower limit of $\lambda(r)$, that the effective Mach number is equal to or smaller than the drag divergence Mach number $M_{dd}$. Even when a rotorcraft flies at the maximum flight Mach number $M_\infty$, therefore, it is possible to surely prevent drag divergence in the blade tip portion 12 from occurring. Consequently, the performance in high-speed flight can be improved, and generation of the high-speed impulsive noise can be prevented from occurring.

In the relational expression (1), it will be seen from an inequality defining the upper limit of $\lambda(r)$, that the swept-back angle $\lambda(r)$ is suppressed to a relatively small value, so that rearward shift of an aerodynamic center is prevented as much as possible from occurring. Therefore, generation of a large pitching moment can be prevented from occurring, and hence a control performance can be improved.

The invention provides a rotor blade for a rotorcraft, comprising:
a blade root portion 10 which is to be attached to a rotor head for rotating;
a center portion 11 which linearly elongates from the blade root portion 10; and
a blade tip portion 12 which has a shape and a predetermined aerofoil, the shape outward elongating from the center portion 11 and being defined by a first leading edge 23a, a second leading edge 23b which is positioned outside the first leading edge 23a, a side edge 25 and a trailing edge 30,
wherein in the first leading edge 23a of the blade tip portion 12, a swept-back angle $\lambda(r)$ at a distance r from a rotation center of a rotor satisfies the following relational expression (1):

$$\cos^{-1} \frac{M_{dd}}{M_\infty + M_{TIP}\frac{r}{R}} \leq \lambda(r) \leq \cos^{-1} \frac{0.985 \times M_{dd}}{M_\infty + M_{TIP}\frac{r}{R}} \quad (1)$$

where R is a rotor blade length of the rotorcraft, $M_\infty$ is a maximum flight Mach number which is a flight limit speed of the rotorcraft, $M_{TIP}$ is a blade tip Mach number which is a tip speed during hovering, and $M_{dd}$ is a drag divergence Mach number determined from the aerofoil of the blade tip portion 12, and the second leading edge 23b of the blade tip portion 12 has a swept-back angle of 60 to 80 degrees.

According to the invention, in the same manner as the configuration described above, it is possible to surely prevent drag divergence in the blade tip portion 12 from occurring, rearward shift of the aerodynamic center is prevented as much as possible from occurring, and the control performance can be improved. Since the second leading edge 23b of the blade tip portion 12 has a swept-back angle of 60 to 80 degrees, it is possible to surely prevent drag divergence in the second leading edge 23b from occurring, and a lift can be increased by the tip vortex which is generated at a high angle of attack.

Furthermore, the invention is characterized in that a chord length C1 between the leading edge 23 and the trailing edge 30 is larger as moving toward an outer side.

According to the invention, the chord length C1 of outside of the blade tip portion 12 is lengthened, and hence a blade thickness ratio can be made smaller. Therefore, generation of a shock wave can be suppressed, and generation of the high-speed impulsive noise can be reduced.

Furthermore, the invention is characterized in that a chord length C1 between the first leading edge 23a and the trailing edge 30 is larger as moving toward the outer side.

According to the invention, in the same manner as described above, the chord length C1 of the outside of the blade tip portion 12 is lengthened, and hence the blade thickness ratio can be made smaller. Therefore, generation of a shock wave can be suppressed, and generation of the high-speed impulsive noise can be reduced.

Furthermore, the invention is characterized in that a chord length C1 between the leading edge 23 and the trailing edge 30 first increases and then decreases as moving toward the outer side.

According to the invention, as moving toward the outer side, the chord length C1 between the leading edge 23 and the trailing edge 30 is larger in an inner portion, and smaller in an outer portion. When the chord length C1 in the inner portion is larger as moving toward the outer side, the blade thickness ratio can be made smaller, and hence generation of the high-speed impulsive noise can be reduced. When the chord length C1 in the outer portion is smaller as moving toward the outer side, the aerodynamic center of the blade tip portion is less shifted in a rearward direction, and hence degradation of the control performance due to increase of the pitching moment can be prevented from occurring. Since the chord length C1 in the outer portion is smaller as moving toward the outer side, frictional drag can be reduced by the reduction in the area of the blade tip portion, lift distribution in the blade tip portion can be improved by the tapering effect, and a lift-drag ratio of the rotor blade can be enhanced, with the result that performances in hovering and medium and low speeds can be improved.

Furthermore, the invention is characterized in that a chord length C1 between the first leading edge 23a and the trailing edge 30 first increases and then decreases as moving toward the outer side.

According to the invention, in the same manner as described above, as moving toward the outer side, the chord length C1 is larger in the inner portion, and smaller in the outer portion. Therefore, the high-speed impulsive noise can be reduced without increasing the pitching moment. The configuration in which the chord length C1 in the outer portion is smaller as moving toward the outer side cooperates with a two-step swept-back angle, so that the frictional drag can be reduced by the further reduction in the area of the blade tip portion, the lift distribution in the blade tip portion can be improved by the tapering effect, and the lift-drag ratio of the rotor blade can be enhanced, with the result that performances in hovering and medium and low speeds can be improved.

Furthermore, the invention is characterized in that the trailing edge 30 has a swept-back angle of 0 to 20 degrees.

According to the invention, in accordance with the leading edge 23 or the first leading edge 23a, also the trailing edge 30 is swept back so as to have a swept-back angle of 0 to 20 degrees. Therefore, an appropriate blade thickness ratio can be maintained, and degradation of the lift characteristics of the aerofoil due to a thinned blade can be prevented from occurring.

When the swept-back angle is appropriately selected in the range of 0 to 20 degrees, the taper ratio of the blade tip portion 12 can be suitably ensured, the lift distribution in the blade tip portion can be improved, and the lift-drag ratio of the rotor blade can be enhanced, with the result that performances in hovering and medium and low speeds can be improved.

When the swept-back angle is appropriately selected in the range of 0 to 20 degrees, the aerodynamic center of the blade tip portion is less shifted in the rearward direction, and hence degradation of the control performance due to increase of the pitching moment can be prevented from occurring.

Furthermore, the invention is characterized in that a pitch angle in a vicinity of an outer end of the center portion 11 is locally made smaller.

In a vicinity of a root of the blade tip portion 12, a leading edge of the blade transfers from a linear shape to a shape having a swept-back angle, and hence the air flow easily separates in the trailing edge which is behind the portion. According to the invention, the pitch angle of the portion is locally made smaller than the other portions. Therefore, the flow separation hardly occurs in the portion, the stall angle can be increased, and the maximum lift coefficient can be increased.

Furthermore, the invention is characterized in that the blade tip portion 12 is further warped downwardly as moving toward the outer side.

According to the invention, the blade tip portion 12 is downwardly warped. Therefore, the tip vortex which is generated in hovering can leave away from the blade more quickly, thereby preventing degradation of performance due to the interaction between the tip vortex and the blade from occurring.

Furthermore, the invention is characterized in that, by combining the blade with a latest high-performance aerofoil, the drag divergence Mach number $M_{dd}$ is in the range of 0.8 and 0.85.

According to the invention, the drag divergence Mach number $M_{dd}$ is set to have a relatively high value in the range of 0.8 to 0.85. Therefore, the swept-back angle $\lambda(r)$ can be suppressed to a small value, and the rearward shift of the aerodynamic center of the blade tip portion 12 can be suppressed to a small degree. Consequently, generation of the large pitching moment in the blade tip portion 12 can be suppressed so as to improve the control performance, and the flight limit speed $M_\infty$ of the rotorcraft can be raised.

BRIEF DESCRIPTION OF THE DRAWINGS

Other and further objects, features, and advantages of the invention will be more explicit from the following detailed description taken with reference to the drawings wherein:

FIG. 6A is a view showing a distribution of a Mach number (a ratio of flow speed to speed of sound) about a rotor blade of a comparative example (in the comparative example, the rotor blade is a rectangular blade), FIG. 6B is a view showing a distribution of a Mach number about the rotor blade 101 of the first embodiment, and FIG. 6C is a view showing a distribution of a Mach number about the rotor blade 102 of a second embodiment;

FIG. 9 is a graph showing the power coefficient CP with respect to a thrust coefficient CT during hovering;

DETAILED DESCRIPTION OF THE PREFERRED EMBODIMENTS

Figure 1:
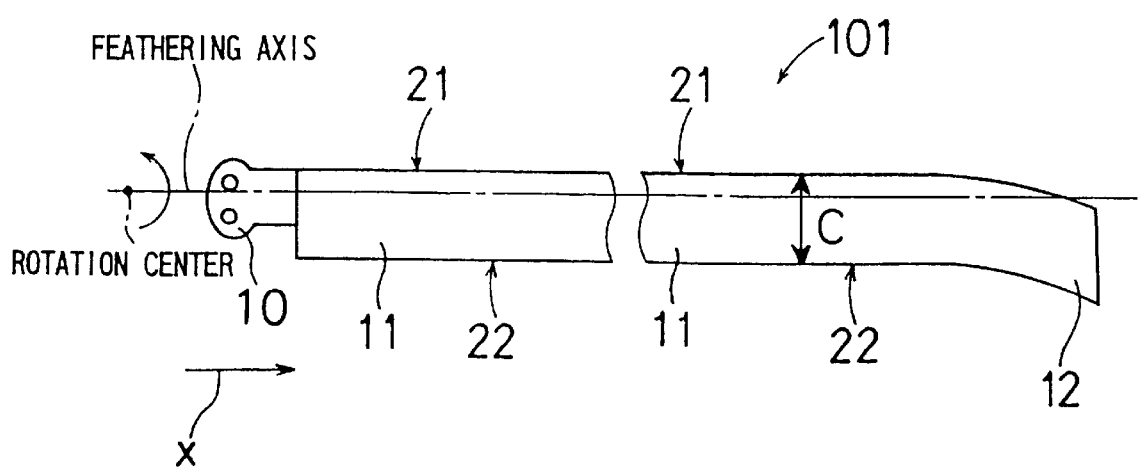
FIG. 1 is a plan view showing a rotor blade 101 which is a first embodiment of the invention.

Now referring to the drawings, preferred embodiments of the invention are described below.

FIG. 1 is a plan view showing a rotor blade 101 which is a first embodiment of the invention. The rotor blade 101 consists of a blade root portion 10, a center portion 11, and a blade tip portion 12. The blade root portion 10 is a member which is to be attached to a rotor head for rotating the rotor blade 101. The center portion 11 linearly elongates from the blade root portion 10 and occupies a most portion of the rotor blade 101. An aerodynamic performance of the rotor blade 101 depends largely on an airfoil which is a section shape of the center portion 11, and a plan shape of the center portion 11 as seen from an upper side. The shape of the center portion 11 as seen from the upper side is defined by a leading edge 21 and a trailing edge 22 which are parallel to each other. A chord length C of the center portion 11 is defined by a distance between the leading edge 21 and the trailing edge 22. The blade tip portion 12 is a tip portion of the rotor blade 101 which elongates from the center portion 11 in a direction opposite to the blade root portion 10.

The rotor blade 101 constitutes a main blade of a helicopter, and is rotated by the rotor head to cause the helicopter to fly.

Figure 2A:
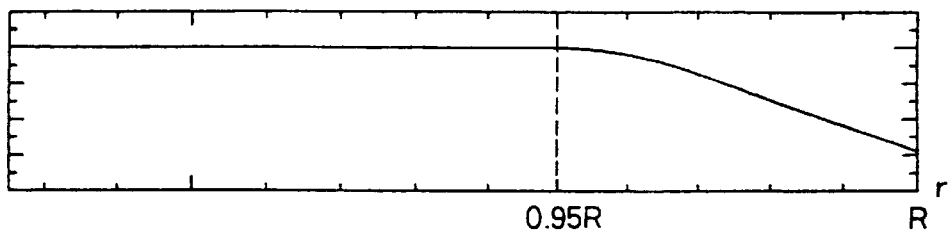
FIG. 2A is a view of a position of one-fourth of the tip chord length of the rotor blade of FIG. 1 as seen from the rear side.
Figure 2B:
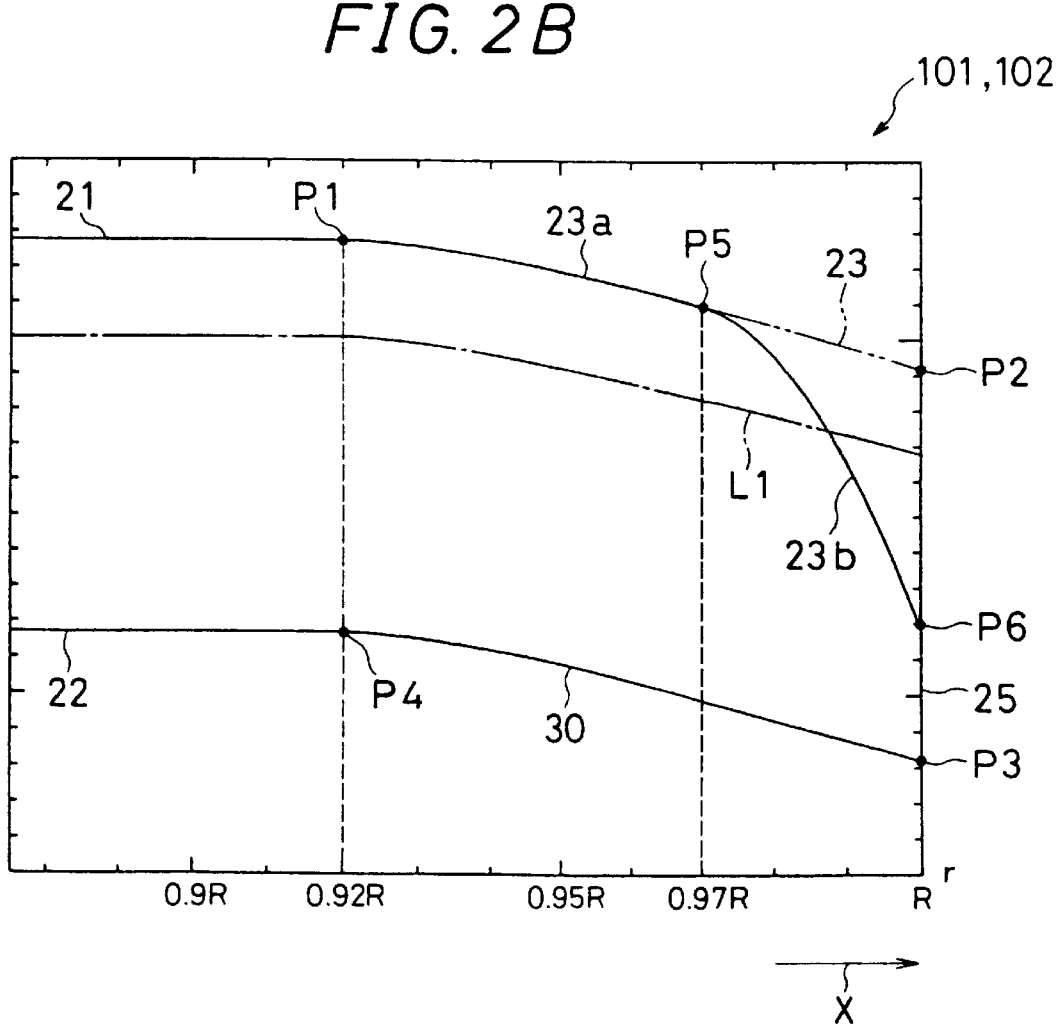
FIG. 2B shows a plan shape of the rotor blade.

FIGS. 2A and 2B are partially enlarged views showing the shape of each of rotor blades 101 and 102 of FIG. 1. FIG. 2A is a view of a position of one-fourth of a tip chord length of the rotor blade of FIG. 1 in a height direction and as seen from a rear side, and FIG. 2B shows a plan shape of the rotor blade. The rotor blade 102 is a second embodiment of the invention. In each of FIGS. 2A and 2B, the abscissa of the graph shown in FIG. 2 indicates a distance r from a rotation center of a rotor.

First, a shape of the blade tip portion 12 of the rotor blade 101 will be described. The shape of the blade tip portion 12 is defined by a leading edge 23, a side edge 25, and a trailing edge 30. The leading edge 23 (including a two-dot chain line in FIG. 2B) elongates from an outer end P1 of the leading edge 21 of the center portion 11 to a blade tip P2 with being swept back as moving to the outer side. In this embodiment, the outer side means a blade tip side in a direction X which coincides with a span direction of the rotor blade 101, and an outer end means an end point of the blade tip in the direction X. A blade length R is a length of the rotor blade 101 in the span direction. For example, the outer end P1 exists at a position in a range of about 0.90R to 0.94R from a rotation center of the rotor blade 101.

A swept-back angle $\lambda(r)$ of the leading edge 23 is a function which depends on the distance r from the rotation center of the rotor, and defined by a relational expression (1). It is assumed that, when a drag divergence Mach number $M_{dd}$ is larger than an effective Mach number $(M_\infty+M_{TIP}r/R)$, $\lambda(r)=0$. The swept-back angle $\lambda(r)$ equals to inclination of each curve constituting the leading edge 23. When the angle is integrated, a locus of the leading edge 23 is obtained. A shape of the leading edge 23 according to the relational expression (1) can prevent drag divergence from occurring and reduce shift of an aerodynamic center.

The side edge 25 elongates from the blade tip P2 to a blade tip P3 with being swept back. The trailing edge 30 is swept back as further outward moving from an outer end P4 of the trailing edge 22 of the center portion 11, so as to elongate to the blade tip P3. The outer end P4 is placed at a position which is separated by a distance of about 0.92R from the rotation center of the rotor. The trailing edge 30 has a swept-back angle of about 0 to 20 degrees.

Next, the rotor blade 102 of the second embodiment will be described. The rotor blade 102 is shaped in an approximately identical manner with the rotor blade 101, but is different therefrom in a shape of the leading edge. The leading edge consists of a first leading edge 23a, and a second leading edge 23b which is disposed outside the first leading edge 23a. The first leading edge 23a elongates along the same curve as a part of the leading edge 23 of the rotor blade 101, from the outer end P1 to an outer end P5 of the first leading edge 23a. The outer end P5 is placed at a position which is separated by a distance of about 0.96R to 0.98R from the rotation center of the rotor. The second leading edge 23b elongates from the outer end P5 of the first leading edge 23a to a blade tip P6 with being swept back as moving toward the outer side. The second leading edge 23b has a swept-back angle of about 60 to 80 degrees. which is larger than that of the leading edge 23, and may elongate linearly or curvedly. The other portions are configured in the strictly same manner as those of the rotor blade 101, and hence their description is omitted.

Figure 3:
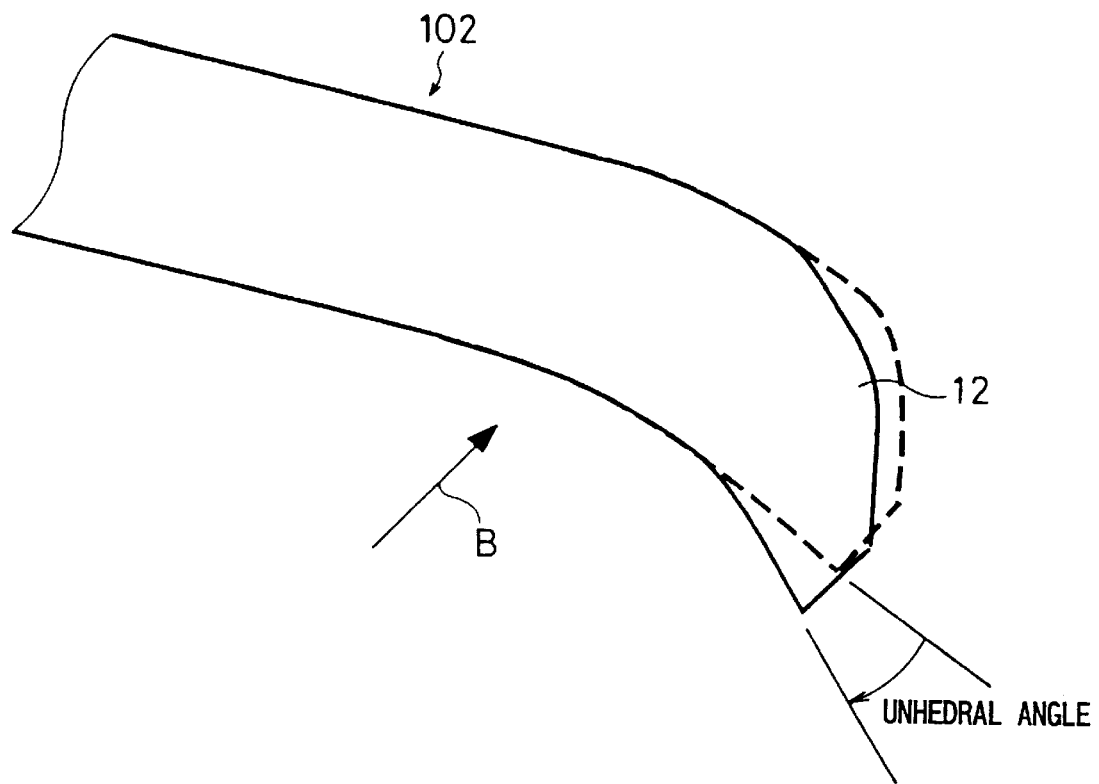
FIG. 3 is a perspective view showing a unhedral angle of a rotor blade 102.
Figure 4A:
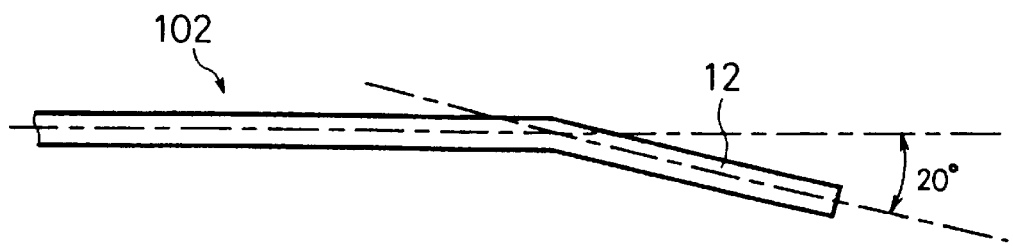
FIGS. 4A and 4B are views of the rotor blade 102 as seen from the rear side or in a direction of an arrow B.
Figure 4B:
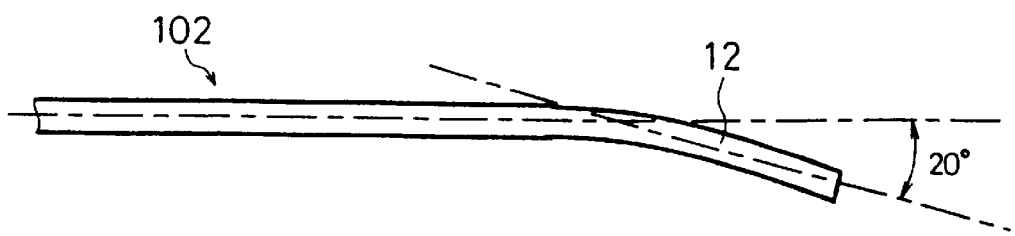

FIG. 3 is a perspective view showing a unhedral angle of the rotor blade 102, and FIGS. 4A and 4B are views of the rotor blade 102 as seen from the rear side or in a direction of an arrow B. The blade tip portion 12 of the rotor blade 102 has a shape which is downward warped as moving toward the outer side. The blade tip portion 12 may be downward warped linearly as shown in FIG. 4A, or curvedly as shown in FIG. 4B. In both the cases, the unhedral angle is about 20 degrees. As shown in FIG. 2A, the downward warp of the blade tip portion 12 is started at a position in a range of about 0.94R to 0.96R from the rotation center of the rotor.

Since the blade tip portion 12 is provided with the unhedral angle as described above, a tip vortex which is generated in hovering can leave away from the blade more quickly, thereby preventing interaction between the tip vortex and the blade from occurring. In the same manner as in the case of the rotor blade 102, also the blade tip portion 12 of the rotor blade 101 has a shape which is downward warped as moving toward the outer side, so as to prevent blade-vortex interaction from occurring.

Figure 5:
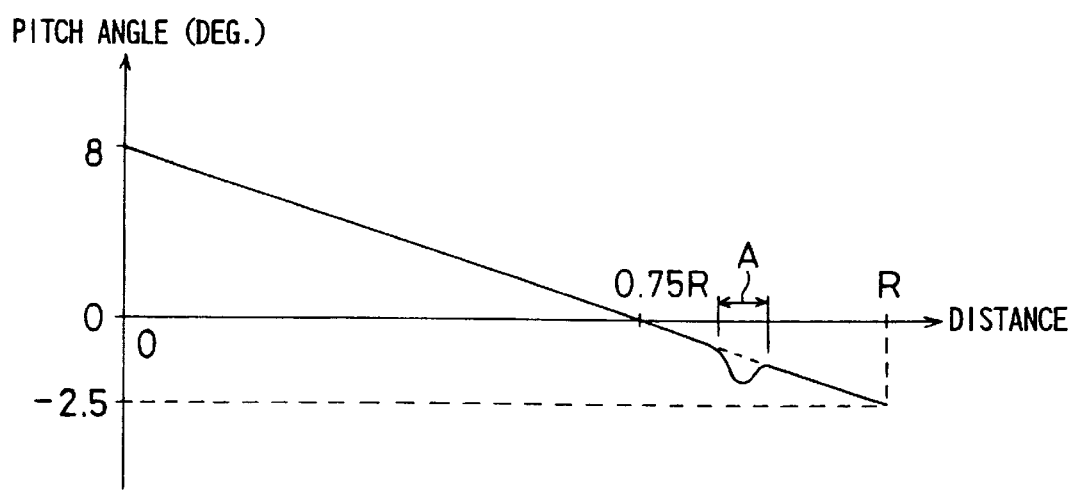
FIG. 5 is a graph showing a pitch angle with respect to a radial distance from a rotation center of the rotor blade 101.

FIG. 5 is a graph showing the pitch angle with respect to a distance from the rotation center of the rotor blade 101. In the graph, the abscissa indicates a distance from the rotation center of the rotor, and the ordinate indicates the pitch angle. As shown in the graph, in the rotor blade 101, the pitch angle is linearly reduced as moving toward the outer side. In other words, the blade is twisted more downward as moving toward the outer side. At an innermost position or a position of a distance of zero, the pitch angle is 8 degrees, and, at an outermost position or a position of a distance of R, the pitch angle is −2.5 degrees. As shown in FIG. 2B, the rotor blade 101 is twisted about an axis L1 more downward as moving toward the outer side. The axis L1 lies rearward from the leading edge by one-fourth of a chord length.

The pitch angle of FIG. 5 is changed linearly, namely in a straight line as a whole. In a region A in the vicinity of the outer end of the center portion 11, a local twist is formed so that the pitch angle is changed nonlinearly, namely in a curved line. Specifically, the inclination of the pitch angle is suddenly reduced in the region A in the vicinity of a distance 0.92R from the rotation center of the rotor, and thereafter again increased to return to the original inclination. In this way, the local twist is formed in the region A. Therefore, the flow separation which may easily occur in the vicinity of a trailing edge of the region A can be prevented from occurring, and the tip stall can be suppressed.

FIG. 6A is a view showing a distribution of a Mach number (a ratio of flow speed to speed of sound) about a rotor blade of a comparative example, FIG. 6B is a view showing the distribution of a Mach number about the rotor blade 101 of the first embodiment, and FIG. 6C is a view showing the distribution of a Mach number about the rotor blade 102 of the second embodiment. In the comparative example, the rotor blade is a rectangular blade.

In FIG. 6A, a phenomenon occurs which is called delocalization of a supersonic region and in which a supersonic region of a surface of a rotor blade is connected to a remote supersonic region. By contrast, in FIG. 6B, a degree of a shock wave is weakened by the shape effect of the rotor blade 101, and delocalization of a supersonic region does not occur. Similarly, in FIG. 6C also, a degree of a shock wave is weakened by the shape effect of the rotor blade 102, and delocalization of a supersonic region does not occur.

Figure 7A:
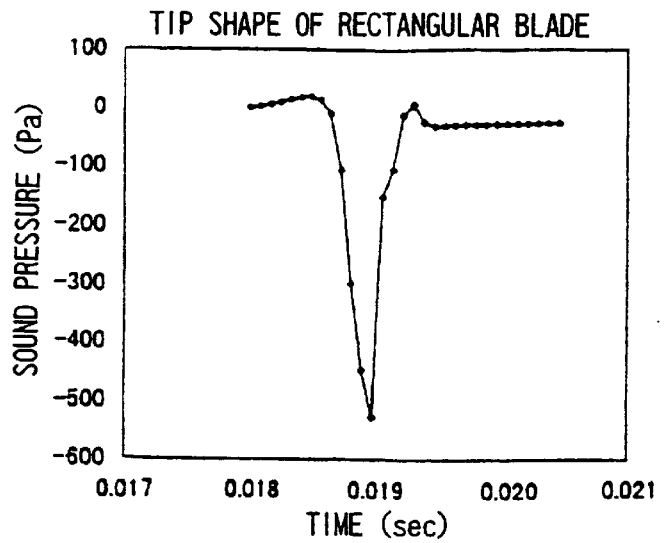
FIG. 7A is a graph showing variation of a sound pressure by the rotor blade of the comparative example.
Figure 7B:
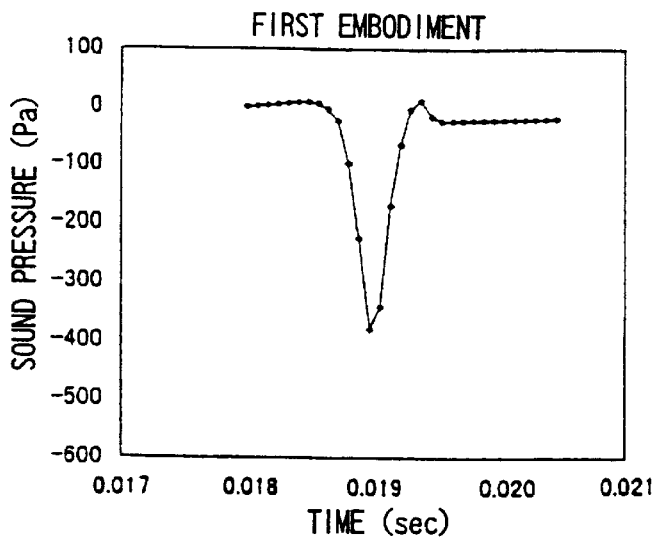
FIG. 7B is a graph showing variation of a sound pressure by the rotor blade 101 of the first embodiment.
Figure 7C:
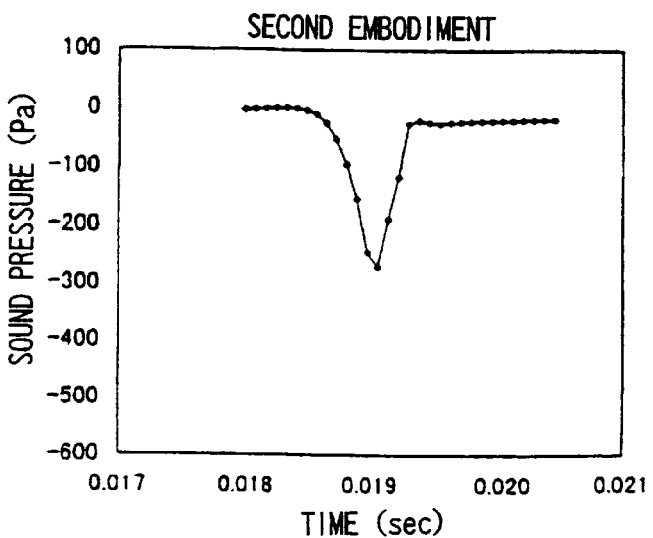
FIG. 7C is a graph showing variation of a sound pressure by the rotor blade 102 of the second embodiment.

FIG. 7A is a graph showing variation of a sound pressure by the rotor blade of the comparative example, FIG. 7B is a graph showing variation of a sound pressure by the rotor blade 101 of the first embodiment, and FIG. 7C is a graph showing variation of a sound pressure by the rotor blade 102 of the second embodiment. In the graphs, the abscissa indicates the time (the unit: second), and the ordinate indicates a sound pressure (the unit: Pa). The minimum value of the sound pressure is about −525 Pa in the case of FIG. 7A, about −375 Pa in the case of FIG. 7B, and about −275 Pa in the case of FIG. 7C.

In the rotor blade 101 of the first embodiment, the sound pressure variation in the vicinity of the blade is smaller than that in the rotor blade of the comparative example. This means that a shock wave which is generated in the vicinity of the blade is weakened by the effect due to the shape of the rotor blade 101, thereby reducing the high-speed impulsive noise. In the rotor blade 102 of the second embodiment, the sound pressure variation in the vicinity of the blade is further smaller. This also means that the shock wave which is generated in the vicinity of the blade is further weakened by the effect due to the shape of the rotor blade 102, thereby reducing the high-speed impulsive noise.

Figure 8:
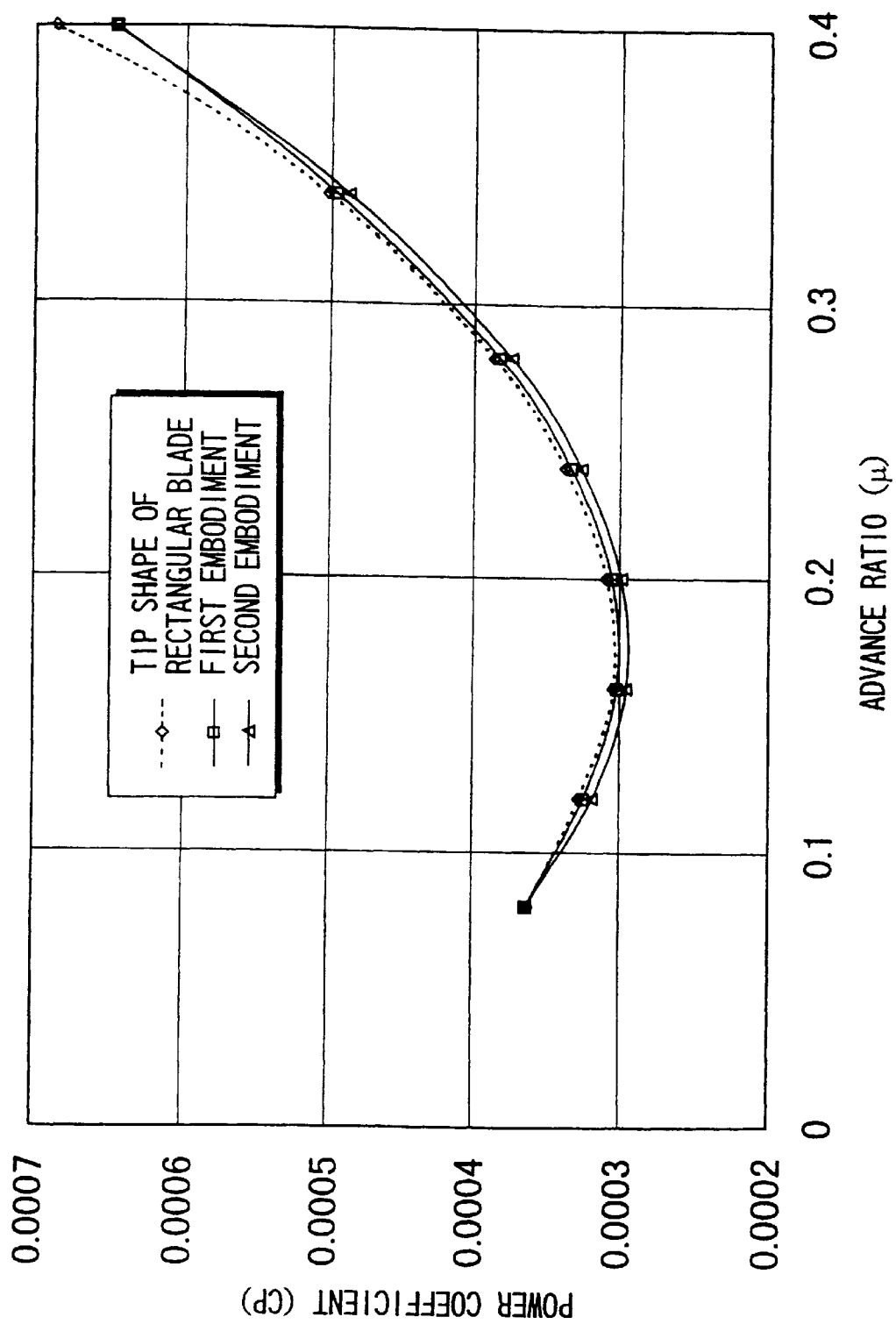
FIG. 8 is a graph showing a power coefficient CP with respect to an advance ratio $\mu$ of a rotor blade.

FIG. 8 is a graph showing a power coefficient CP with respect to an advance ratio $\mu$ of a rotor blade. FIG. 8 shows curves respectively relating to the rotor blade 101 of the first embodiment, and the rotor blade 102 of the second embodiment. The abscissa of the graph indicates the advance ratio $\mu$, and the ordinate indicates the power coefficient CP. From the graph, it will be seen that, in a wide range of the advance ratio $\mu$, the power coefficient CP in the first embodiment is smaller than that in the comparative example. This means that a less power is required to obtain the same advance ratio $\mu$, and hence the performance is higher. In the second embodiment, the power coefficient CP is further smaller and the required power is less, resulting in higher performance.

In both the first and second embodiments, a difference between the power coefficient and that of the comparative example is larger as the advance ratio $\mu$ is higher. In this example, the power coefficient in each of the first and second embodiments is smaller by about 6% than that of the comparative example. This means that the first and second embodiments are superior in high-speed performance than a rotor of the comparative example.

FIG. 9 is a graph showing the power coefficient CP with respect to a thrust coefficient CT during hovering. FIG. 9 shows curves respectively relating to the rotor blade 101 in which the unhedral angle is formed as shown in FIG. 3, and a rotor blade in which the unhedral angle is not formed. The abscissa of the graph indicates the thrust coefficient CT, and the ordinate indicates the power coefficient CP. From the graph, it will be seen that, in a wide range of the thrust coefficient CT, the power coefficient CP of the blade of "addition of unhedral angle" is smaller than that of the blade of "no addition of unhedral angle." This means that a less power is required to obtain the same thrust during hovering, and hence the performance is higher.

Figure 10A:
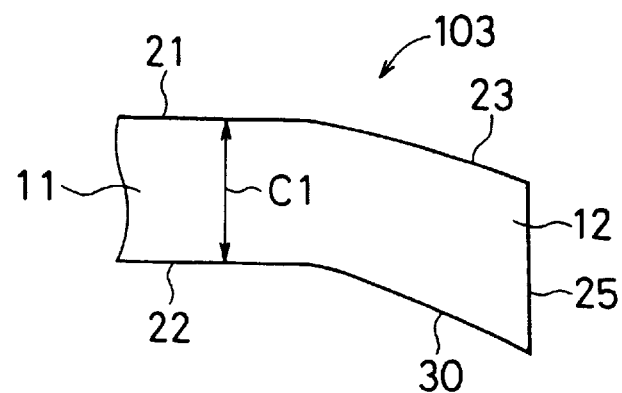
FIG. 10A is a view showing a rotor blade 103 of a third embodiment.
Figure 10B:
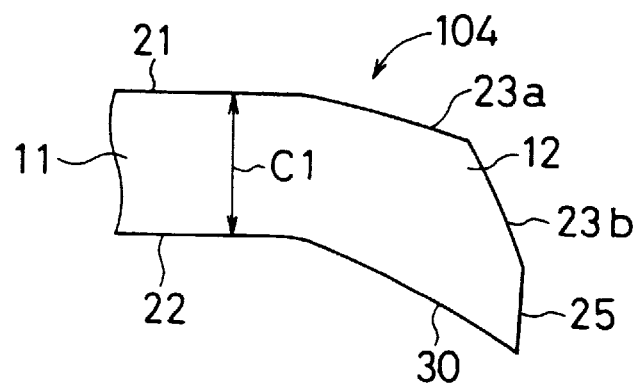
FIG. 10B is a view showing a rotor blade 104 of a fourth embodiment.
Figure 10C:
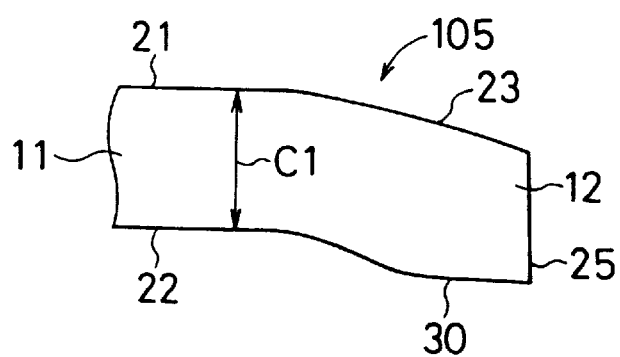
FIG. 10C is a view showing a rotor blade 105 of a fifth embodiment.
Figure 10D:
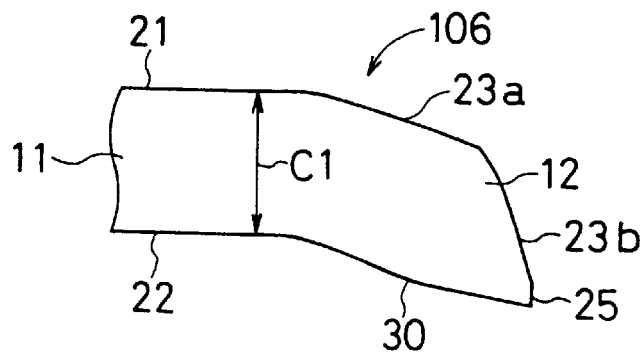
FIG. 10D is a view showing a rotor blade 106 of a sixth embodiment.
Figure 11:
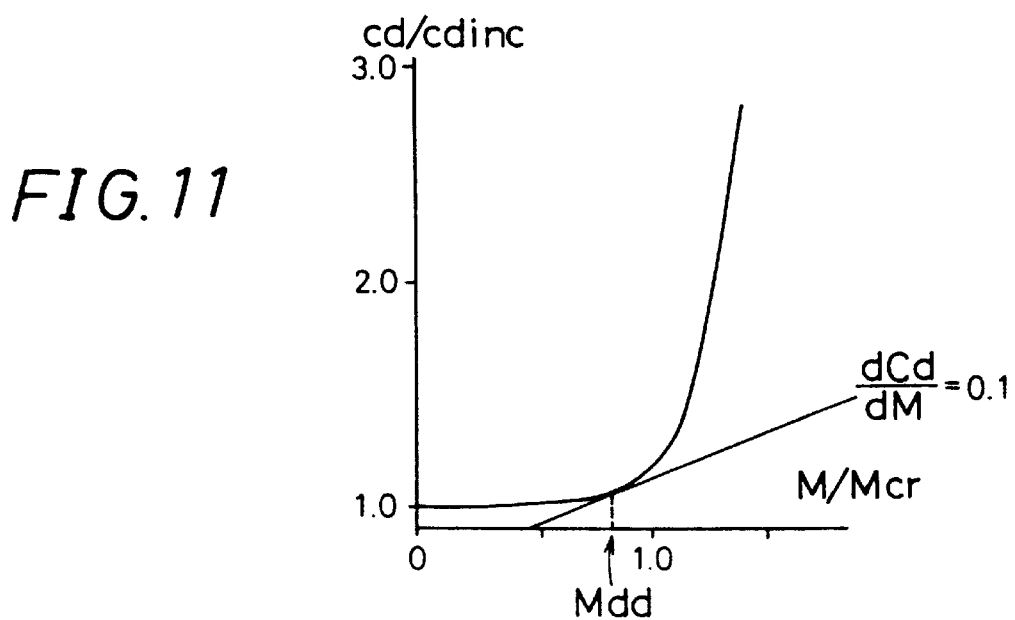
FIG. 11 is a graph showing a drag divergence Mach number $M_{dd}$.
Figure 12:
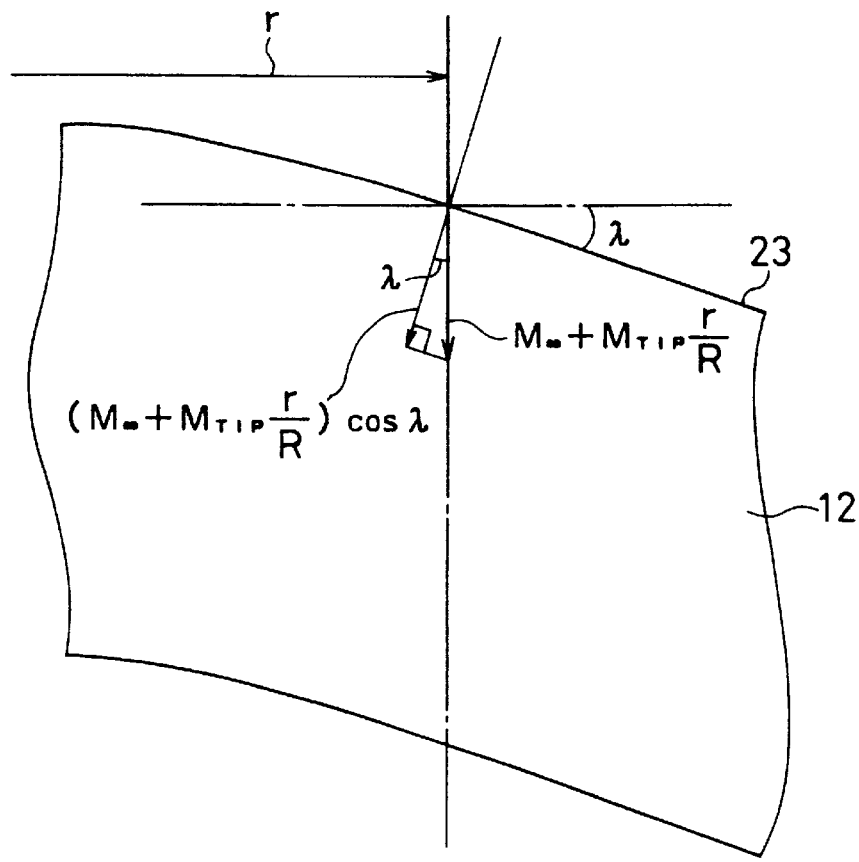
FIG. 12 is a view showing a effective Mach number of a leading edge 23.
Figure 13B:
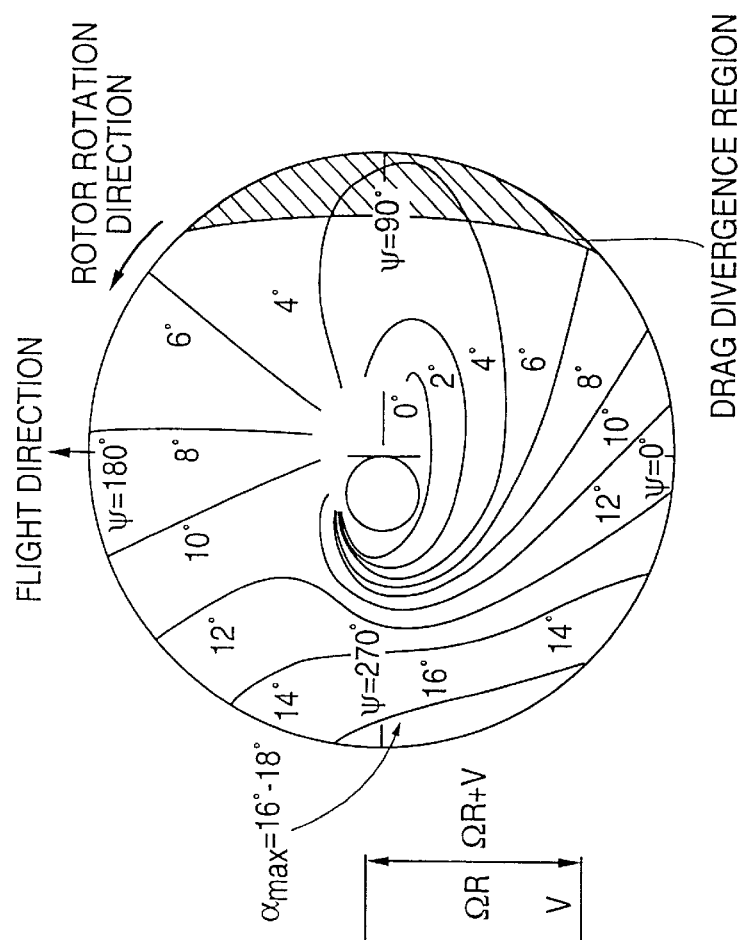
FIGS. 13A and 13B are views showing an aerodynamic environment of a helicopter rotor in the forward flight case.
Figure 13A:
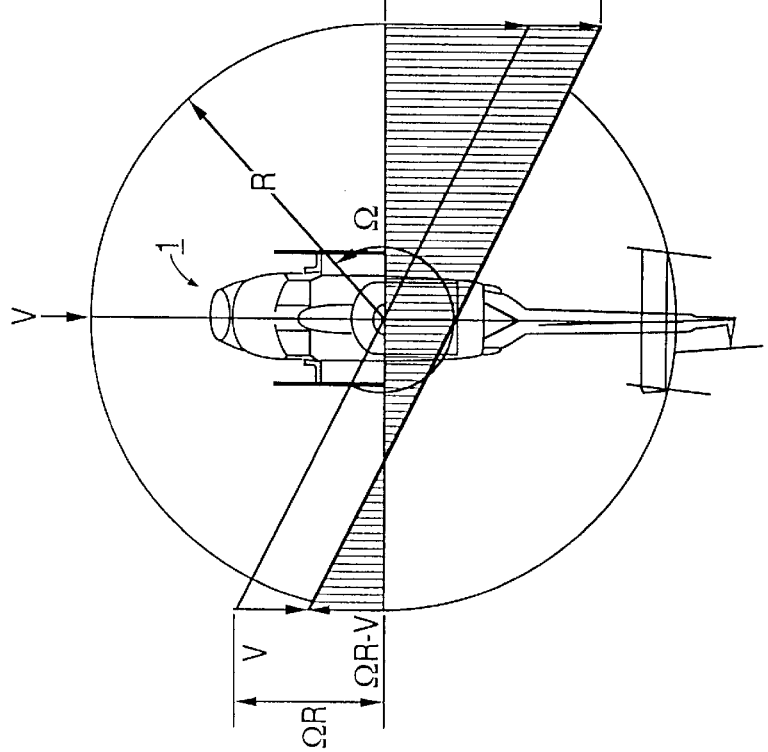
Figure 14A:
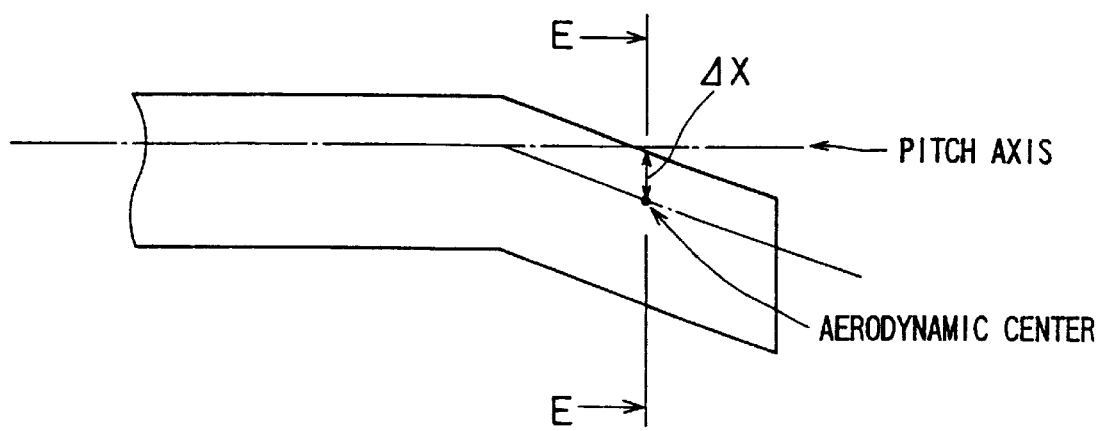
FIGS. 14A and 14B are views showing the shape of a blade tip portion in which a simple swept-back angle is formed.
Figure 14B:
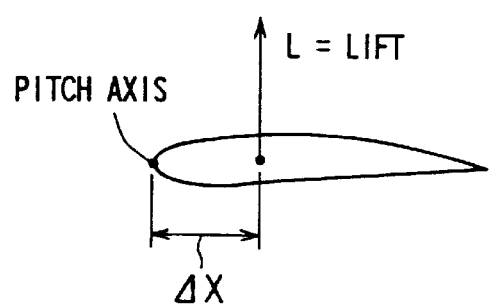

FIG. 10A is a view showing a rotor blade 103 of a third embodiment, FIG. 10B is a view showing a rotor blade 104 of a fourth embodiment, FIG. 10C is a view showing a rotor blade 105 of a fifth embodiment, and FIG. 10D is a view showing a rotor blade 106 of a sixth embodiment.

The rotor blade 103 of FIG. 10A has a substantially same shape as the rotor blade 101 of the first embodiment, but the swept-back angle of the trailing edge 30 is larger than that of the leading edge 23. According to this configuration, a chord length C1 between the leading edge 23 and the trailing edge 30 is larger as moving toward the outer side. When the chord length C1 of the outside of the blade tip portion 12 is lengthened, the blade thickness ratio can be made smaller. Therefore, generation of a shock wave can be further suppressed, and generation of the high-speed impulsive noise can be reduced.

The rotor blade 104 of FIG. 10B has a substantially same shape as the rotor blade 102 of the second embodiment, but the swept-back angle of the trailing edge 30 is larger than that of the first leading edge 23a. According to this configuration, the chord length C1 between the first leading edge 23a and the trailing edge 30 is larger as moving toward the outer side. When the chord length C1 of the outside of the blade tip portion 12 is lengthened, the blade thickness ratio can be made smaller in the same manner as described above. Therefore, generation of a shock wave can be further suppressed, and generation of the high-speed impulsive noise can be reduced.

The rotor blade 105 of FIG. 10C has a substantially same shape as the rotor blade 101 of the first embodiment, but the swept-back angle of the trailing edge 30 is larger than that of the leading edge 23 in the inner portion of the blade tip portion 12, and is smaller in the outer portion of the blade tip portion 12. The position where the change of the chord length C1 as moving toward the outer side is transferred from increase to reduction exists at 0.93R to 0.95R from the rotation center of the rotor. The chord length C1 between the leading edge 23 and the trailing edge 30 is first increased and then reduced as moving toward the outer side. When the chord length C1 in the inner portion is larger as moving toward the outer side, the blade thickness ratio can be made smaller, and hence generation of the high-speed impulsive noise can be reduced. When the chord length C1 in the outer portion is smaller as moving toward the outer side, the aerodynamic center of the blade tip portion is less shifted in a rearward direction, and hence degradation of the control performance due to increase of a pitching moment can be prevented from occurring. Since the chord length C1 in the outer portion is smaller as moving toward the outer side, a frictional drag can be reduced by reduction in area of the blade tip portion, the lift distribution in the blade tip portion can be improved by the tapering effect, and a lift-drag ratio of the rotor blade can be enhanced, with the result that performances in hovering and medium and low speeds can be improved.

The rotor blade 106 of FIG. 10D has a substantially same shape as the rotor blade 102 of the second embodiment, but the swept-back angle of the trailing edge 30 is larger than that of the first leading edge 23a in the inner portion of the blade tip portion 12, and is smaller in the outer portion of the blade tip portion 12. The position where a change of the chord length C1 is transferred from increase to reduction exists at 0.93R to 0.95R from the rotation center of the rotor. The chord length C1 between the first leading edge 23a and the trailing edge 30 is first increased and then reduced as moving toward the outer side. When the chord length C1 in the inner portion is larger as moving toward the outer side and the chord length C1 in the outer portion is smaller as moving toward the outer side, the high-speed impulsive noise can be reduced without increasing the pitching moment. The configuration in which the chord length C1 in the outer portion is smaller as moving toward the outer side cooperates with a two-step swept-back angle, so that the frictional drag can be reduced by the further reduction in the area of the blade tip portion, the lift distribution in the blade tip portion can be improved by the tapering effect, and the lift-drag ratio of the rotor blade can be enhanced, with the result that performances in hovering and medium and low speeds can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotor blade for a rotorcraft comprising:
    a blade root portion which is to be attached to a rotor head for rotating;
    a center portion which linearly elongates from the blade root portion; and
    a blade tip portion which has a shape and a predetermined aerofoil, the shape elongating outward from the center portion and being defined by a leading edge, a side edge, and a trailing edge,
    wherein in the leading edge of the blade tip portion, a swept-back angle $\lambda(r)$ at a distance r from a rotation center of a rotor satisfies the following relational expression (1):

$$\cos^{-1}\frac{M_{dd}}{M_\infty + M_{TIP}\frac{r}{R}} \leq \lambda(r) \leq \cos^{-1}\frac{0.985 \times M_{dd}}{M_\infty + M_{TIP}\frac{r}{R}} \quad (1)$$

where R is a rotor blade length of the rotorcraft, $M_\infty$ is a maximum flight Mach number which is a flight limit speed of the rotorcraft, $M_{TIP}$ is a blade tip Mach number which is a tip speed during hovering, and $M_{dd}$ is a drag divergence Mach number determined from the aerofoil of the blade tip portion.

2. A rotor blade for a rotorcraft comprising:
    a blade root portion which is to be attached to a rotor head for rotating;
    a center portion which linearly elongates from the blade root portion; and
    a blade tip portion which has a shape and a predetermined aerofoil, the shape outward elongating from the center portion and being defined by a first leading edge, a second leading edge which is positioned outside the first leading edge, a side edge and a trailing edge,
    wherein in the first leading edge of the blade tip portion, a swept-back angle $\lambda(r)$ at a distance r from a rotation center of a rotor satisfies the following relational expression (1):

$$\cos^{-1}\frac{M_{dd}}{M_\infty + M_{TIP}\frac{r}{R}} \leq \lambda(r) \leq \cos^{-1}\frac{0.985 \times M_{dd}}{M_\infty + M_{TIP}\frac{r}{R}} \quad (1)$$

where R is a rotor blade length of the rotorcraft, $M_\infty$ is a maximum flight Mach number which is a flight limit speed of the rotorcraft, $M_{TIP}$ is a blade tip Mach number which is a tip speed during hovering, and $M_{dd}$ is a drag divergence Mach number determined from the aerofoil of the blade tip portion, and the second leading edge of the blade tip portion has a swept-back angle of 60 to 80 degrees.

3. The rotor blade for a rotorcraft of claim 1, wherein a chord length C1 between the leading edge and the trailing edge is larger as moving toward an outer side.

4. The rotor blade for a rotorcraft of claim 2, wherein a chord length C1 between the first leading edge and the trailing edge is larger as moving toward the outer side.

5. The rotor blade for a rotorcraft of claim 1, wherein a chord length C1 between the leading edge and the trailing edge first increases and then decreases as moving toward the outer side.

6. The rotor blade for a rotorcraft of claim 2, wherein a chord length C1 between the first leading edge and the trailing edge first increases and then decreases as moving toward the outer side.

7. The rotor blade for a rotorcraft of claim 1, wherein the trailing edge has a swept-back angle of 0 to 20 degrees.

8. The rotor blade for a rotorcraft of claim 1, wherein a pitch angle in a vicinity of an outer end of the center portion is locally made smaller.

9. The rotor blade for a rotorcraft of claim 1, wherein the blade tip portion is further warped downwardly as moving toward the outer side.

10. The rotor blade for a rotorcraft of claim 1, wherein by combining the blade with a latest high-performance aerofoil, the drag divergence Mach number $M_{dd}$ is in the range of 0.8 and 0.85.

11. The rotor blade for a rotorcraft of claim 2, wherein the trailing edge has a swept-back angle of 0 to 20 degrees.

12. The rotor blade for a rotorcraft of claim 2, wherein a pitch angle in a vicinity of an outer end of the center portion is locally made smaller.

13. The rotor blade for a rotorcraft of claim 2, wherein the blade tip portion is further warped downwardly as moving toward the outer side.

14. The rotor blade for a rotorcraft of claim 2, wherein by combining the blade with a latest high-performance aerofoil, the drag divergence Mach number $M_{dd}$ is in the range of 0.8 and 0.85.

* * * * *